United States Patent
Edme et al.

(10) Patent No.: US 9,304,221 B2
(45) Date of Patent: Apr. 5, 2016

(54) DETERMINING AN INDICATION OF WAVEFIELD VELOCITY

(75) Inventors: Pascal Edme, Cambridge (GB); Everhard Johan Muyzert, Cambridge (GB)

(73) Assignee: WesternGeco L.L.C., Houston, TX (US)

( * ) Notice: Subject to any disclaimer, the term of this patent is extended or adjusted under 35 U.S.C. 154(b) by 621 days.

(21) Appl. No.: 13/277,960

(22) Filed: Oct. 20, 2011

(65) Prior Publication Data
US 2012/0253683 A1  Oct. 4, 2012

Related U.S. Application Data

(63) Continuation-in-part of application No. 13/208,860, filed on Aug. 12, 2011.

(60) Provisional application No. 61/471,363, filed on Apr. 4, 2011.

(51) Int. Cl.
| | | |
|---|---|---|
| *G01V 1/28* | (2006.01) | |
| *G01V 1/36* | (2006.01) | |
| *G01V 1/30* | (2006.01) | |
| *G01V 1/16* | (2006.01) | |

(52) U.S. Cl.
CPC ............. *G01V 1/303* (2013.01); *G01V 1/162* (2013.01); *G01V 1/28* (2013.01); *G01V 1/36* (2013.01)

(58) Field of Classification Search
CPC .................................. G01V 1/28; G01V 1/303
USPC .......................... 367/38, 56, 58; 181/112, 122
See application file for complete search history.

(56) References Cited

U.S. PATENT DOCUMENTS

| | | | |
|---|---|---|---|
| 2,657,373 A * | 10/1953 | Piety ................................ 367/58 |
| 4,320,471 A * | 3/1982 | Rietsch ........................... 367/49 |
| 4,890,264 A | 12/1989 | Crews et al. |
| 5,621,699 A | 4/1997 | Rigsby et al. |
| 5,696,734 A | 12/1997 | Corrigan |
| 5,971,095 A | 10/1999 | Ozbek |
| 6,182,015 B1 | 1/2001 | Altan et al. |
| 7,656,746 B2 | 2/2010 | De Kok et al. |
| 2005/0180261 A1* | 8/2005 | Mandal ........................... 367/31 |
| 2006/0245300 A1 | 11/2006 | De Kok et al. |
| 2008/0049551 A1 | 2/2008 | Muyzert et al. |
| 2010/0008186 A1 | 1/2010 | Sitton et al. |
| 2010/0103770 A1 | 4/2010 | De Kok et al. |
| 2010/0195439 A1 | 8/2010 | Muyzert |
| 2010/0202251 A1 | 8/2010 | Ozdemir et al. |
| 2010/0274489 A1 | 10/2010 | Horne |
| 2011/0082647 A1 | 4/2011 | Edme et al. |
| 2012/0113749 A1 | 5/2012 | Edme et al. |

(Continued)

FOREIGN PATENT DOCUMENTS

WO   2010122400 A2   10/2010

OTHER PUBLICATIONS

Ikelle et al, Introduction to Petroleum Seismology, (Investigations in Geophysics: No. 12) pp. 316-317, 2005 SEG.*

(Continued)

*Primary Examiner* — Ian J Lobo

(57) ABSTRACT

Translational data acquired by at least one translational survey sensor is received, and rotation data is received. A representation of wavefield velocity based on the translational data and the rotation data is determined.

17 Claims, 4 Drawing Sheets

(56) References Cited

U.S. PATENT DOCUMENTS

2012/0250460 A1    10/2012    Edme et al.
2013/0088939 A1    4/2013    Edme et al.

OTHER PUBLICATIONS

Anonymous, "A Non-Traditional High Performance Broad-Band Seismometer", PMD/eentec, retrieved Aug. 9, 2011, pp. 1-7.

Anonymous, "R-1 triaxial Rotational Seismometer", PMD/eentec, retrieved Aug. 9, 2011, pp. 1-2.

Cochard, et al., "Rotational Motions in Seismology: Theory, Observation, Simulation", Earthquake Source Asymmetry, Structural Media and Rotation Effects, 2006, Springer: The Netherlands, pp. 391-411.

Gomez, et al., "Using the Karhunen-Loeve Transform to Suppress Ground Roll in Seismic Data", Earth Sci. Res. J., vol. 9 (2), 2005, pp. 139-147.

Igel, et al., "Broad-band observations of earthquake-induced rotational ground motions", Geophysical Journal International, vol. 168 (1), Jan. 2007, pp. 182-196.

Igel, et al., "Rotational motions induced by the M8.1 Tokachi-oki earthquake", Geophysical Research Letters, vol. 32, Sep. 25, 2003, pp. 1-4.

Karsli, et al., "Using the Wiener—Levinson algorithm to suppress ground-roll", Journal of Applied Geophysics, vol. 55(3-4), 2004, pp. 187-197.

Kendall, et al., "An SVD-polarization filter for ground roll attenuation on multicomponent data", EAGE/SEG Research Workshop—Multicomponent Seismic—Past, Present and Future, Sep., 2005, pp. 1-4.

Kragh, et al., "Ground roll and polarization", First Break, vol. 13(9), 1995, pp. 369-378.

Langston, et al., "Gradiometry for polarized seismic waves", Journal of Geophysical Research: Solid Earth, vol. 113 (B8), Aug. 2008, pp. 1-15.

Langston, et al., "Seismic-Wave Strain, Rotation, and Gradiometry for the 4 Mar. 2008 TAIGER Explosions", Bulletin of the Seismological Society of America, vol. 99 (2B), May 2009, pp. 1287-1301.

Langston, Charles A., "Spatial Gradient Analysis for Linear Seismic Arrays", Bulletin of the Seismological Society of America, vol. 97 (1B), Feb. 2007, pp. 265-280.

Langston, Charles A., "Wave Gradiometry in the Time Domain", Bulletin of the Seismological Society of America, vol. 97 (3), Jun. 2007, pp. 926-933.

Langston, Charles A., "Wave Gradiometry in Two Dimensions", Bulletin of the Seismological Society of America, vol. 97 (2), Apr. 2007, pp. 401-416.

Muyzert, et al., "Near-Surface S-Velocities, Statics, and Anisotropy Estimated from Scholte Waves", 64th EAGE Conference & Exhibition, May 27, 2002, pp. 1-4.

Pancha, et al., "Ring laser detection of rotations from teleseismic waves", Geophysical Research Letters, vol. 27 (21), Nov. 1, 2000, pp. 3553-3556.

Stupazzini, et al., "Study of rotational ground motion in the near field region", Bulletin of The Seismological Society of America, vol. 99, 2009, pp. 1271-1286.

Wang, et al., "Source and basin effects on rotational ground motions: comparison with translations", Bulletin of The Seismological Society of America, vol. 99, 2009, pp. 1162-1173.

International Search Report issued in PCT/US2012/031385 on Nov. 1, 2012, 3 pages.

International Search Report and Written Opinion issued in PCT/US2012/031930 on Nov. 1, 2012, 9 pages.

Suryanto, "Rotational Motions in Seismology, Theory and Application", Dec. 21, 2006, XP055226264, Munchen, DE, https://edoc.ub.uni-muenchen.de/785011/Suryanto_Wiwit.pdf, Chapter 4, Section 5,5.

Supplemental Search Report issued in related EP application 12768533.7 on Nov. 17, 2015, 3 pages.

* cited by examiner

DETERMINING AN INDICATION OF WAVEFIELD VELOCITY

CROSS REFERENCE TO RELATED APPLICATIONS

This application is a continuation-in-part of U.S. Ser. No. 13/208,860, entitled "Noise Attenuation using Rotation Data," filed Aug. 12, 2011, U.S. Publication No. 2012/0250460,which claims the benefit under 35 U.S.C. §119(e) of U.S. Provisional Application Ser. No. 61/471,363 entitled "Method for Noise Removal Using Rotational Sensor," filed Apr. 4, 2011, both of which are hereby incorporated by reference.

BACKGROUND

Seismic surveying is used for identifying subterranean elements, such as hydrocarbon reservoirs, freshwater aquifers, gas injection zones, and so forth. In seismic surveying, seismic sources are placed at various locations on a land surface or seafloor, with the seismic sources activated to generate seismic waves directed into a subterranean structure.

The seismic waves generated by a seismic source travel into the subterranean structure, with a portion of the seismic waves reflected back to the surface for receipt by seismic sensors (e.g. geophones, accelerometers, etc.). These seismic sensors produce signals that represent detected seismic waves. Signals from the seismic sensors are processed to yield information about the content and characteristic of the subterranean structure.

A land-based seismic survey arrangement can include deploying an array of seismic sensors on the ground. Marine surveying can involve deploying seismic sensors on a streamer or seabed cable.

SUMMARY

In general, according to some implementations, translational data acquired by at least one translational survey sensor is received. Rotation data acquired by at least one rotational sensor is received. A representation of wavefield velocity based on the translational data and the rotation data is determined In general, according to further implementations, an article includes at least one machine-readable storage medium storing instructions that upon execution cause a system to receive translational data acquired by at least one translational survey sensor, and receive horizontal rotation data. A representation of wavefield velocity is computed based on the translational data and the horizontal rotation data.

In general, according to further implementations, a system includes a storage medium to store rotation data acquired by at least one rotational sensor, and translational data acquired by at least one translational survey sensor in response to activation of an active survey source. At least one processor is to compute a representation of wavefield velocity based on the translational data and the rotation data.

In further or other implementations, the rotation data is generally about a horizontal axis.

In further or other implementations, the rotation data includes rotation data that is generally about a first horizontal axis, and rotation data that is generally about a second, different horizontal axis.

In further or other implementations, the representation of the wavefield velocity includes an apparent slowness of a wavefield.

In further or other implementations, the apparent slowness of the wavefield includes an apparent horizontal slowness in at least one direction.

In further or other implementations, representations of the wavefield velocity at plural frequencies are determined In further or other implementations, the representation of the wavefield velocity includes an apparent velocity of a wavefield.

In further or other implementations, the representation of the wavefield velocity includes a ratio of the rotation data to the translational data.

In further or other implementations, the ratio includes a ratio of horizontal rotation data to a vertical translational data.

In further or other implementations, the representation of the wavefield velocity is used to perform a task with respect to a seismic survey for characterizing a subterranean structure.

In further or other implementations, plural samples of the translational data and rotation data are received, and where determining the representation of the wavefield velocity is based on the plural samples of the translational data and the rotation data.

In further or other implementations, the plural samples of the translational data and rotation data include plural samples that are within a time window of a predefined length.

In further or other implementations, further samples of translational data and rotation data are received in a second time window of the predefined length, and a further indication of wavefield velocity is determined based on the translational data and the rotation data in the further samples.

In further or other implementations, the representation of the wavefield velocity includes a frequency-dependent representation of the wavefield velocity In further or other implementations, the horizontal rotation data includes a rotation rate generally about a horizontal axis.

In further or other implementations, the horizontal rotation data is based on measurement of a rotational sensor, where the rotational sensor is co-located with the translational survey sensor within a housing.

In further or other implementations, the translational data includes vertical translational data.

In further or other implementations, the representation of the wavefield velocity is computed for one or more frequencies of a wavefield of interest.

In further or other implementations, the rotation data is rotated, and where the representation of wavefield velocity is based on the rotated rotation data.

Other features will become apparent from the following description, from the drawings, and from the claims.

BRIEF DESCRIPTION OF THE DRAWINGS

Some embodiments are described with respect to the following figures.

DETAILED DESCRIPTION

Figure 1:
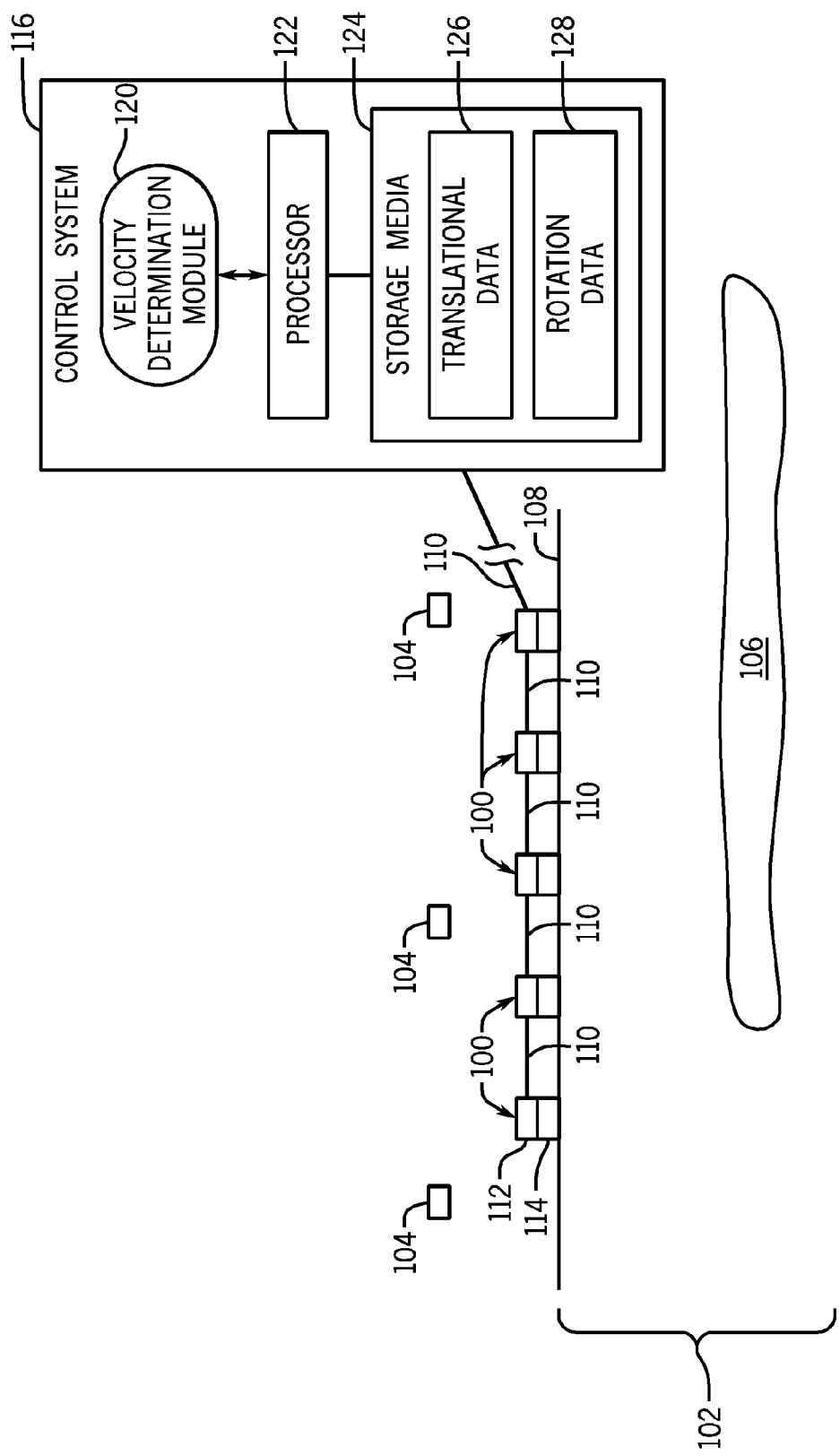
FIG. 1 is a schematic diagram of an example arrangement of sensor assemblies that can be deployed to perform seismic surveying, according to some embodiments.

In seismic surveying (marine or land-based seismic surveying), seismic sensors (e.g. geophones, accelerometers, etc.) are used to measure seismic data, such as displacement, velocity or acceleration data. Seismic sensors can include geophones, accelerometers, MEMS (microelectromechanical systems) sensors, or any other types of sensors that measure the translational motion (displacement, velocity, or acceleration, for example) of the surface in at least one direction, such as the vertical direction. A seismic sensor can also measure translation motion in another direction, such as in one or both horizontal directions. A seismic sensor at the earth's surface can record the vectorial component of an elastic wavefield just below the free surface (land surface or seafloor, for example).

A seismic sensor can also be referred to as a "translational seismic sensor" or more generally a "translational survey sensor." The translation motion (or vectorial component of a wavefield) measured by the seismic sensor is referred to as translational data. When multicomponent sensors are deployed, the wavefield vector components can be measured in multiple directions, such as three orthogonal directions (vertical Z, horizontal inline X, horizontal crossline).

Determining an apparent velocity of a measured wavefield can be useful for various purposes. An "apparent velocity" of a wavefield can refer to a velocity of the wavefield as observed in a given direction (e.g. horizontal direction). Note that the apparent velocity of the wavefield depends both on the horizontal direction of propagation and on the vertical incident angle (angle with respect to the vertical axis) of the wavefield at the seismic sensor. For an inline propagating wave, if this incident angle (with respect to the vertical axis) is represented as $\alpha$, and the actual velocity of the wavefield is V, then the apparent horizontal inline velocity (v) can be expressed as $v = V/\sin \alpha$, while the crossline apparent velocity is infinity. Generally speaking the apparent horizontal velocity (also known as the inverse of the ray parameter or horizontal slowness) is a property or attribute that fully characterizes a ray path (or a ray front). The ray parameter is a parameter which can be used in many calculations.

Because the ray parameter remains constant along the entire ray path (invariant in transmission, reflection, refraction, and transformation), the ray parameter can be used to model the whole travel path of the ray in the subterranean structure (ray tracing).

In some examples, the apparent velocity of a wavefield can be used to perform near-surface characterization of at least one property of a subterranean structure near the earth surface or seafloor, such as within 50 meters of the earth surface or seafloor. In other examples, the apparent velocity of the wavefield can be used to decompose a wavefield into sub-components, such as a P wave and an S wave. A P wave is a compression wave, while an S wave is a shear wave. The P wave extends in the direction of propagation of a seismic wavefield, while the S wave extends in a direction generally perpendicular to the direction of propagation of the seismic wavefield.

In further examples, the apparent velocity of the wavefield can be used for noise attenuation. Recorded seismic data can contain contributions from noise, including horizontal propagation noise such as ground-roll noise. Ground-roll noise refers to seismic waves produced by seismic sources, or other sources such as moving cars, engines, pump and natural phenomena such as wind and ocean waves, that travel generally horizontally along an earth surface towards seismic receivers. These horizontally travelling seismic waves, such as Rayleigh waves or Love waves, are undesirable components that can contaminate seismic data. Another type of ground-roll noise includes Scholte waves that propagate horizontally below a seafloor. Other types of horizontal noise include flexural waves or extensional waves. Yet another type of noise includes an air wave, which is a horizontal wave that propagates at the air-water interface in a marine survey context.

In other examples, the apparent velocity of the wavefield can be used for performing stacking, which involves aggregating (e.g. summing) traces of recorded seismic data together to form a seismic record. Stacking can improve overall data quality, as well as reduce noise.

Although various examples of uses of apparent velocity are set forth above, it is noted that there can be other example uses of apparent velocity of a wavefield.

In accordance with some embodiments, a representation of a velocity of a wavefield can be determined based on translational data acquired by at least one translational seismic sensor and based on rotation data acquired by at least one rotational sensor. The "representation of a velocity" of a wavefield can be an apparent velocity, an apparent slowness (which is the inverse of apparent velocity), or any other indication of the velocity of the observed wavefield. In some cases (such as in cases involving horizontally propagating wavefields), the apparent velocity corresponds to the actual velocity in the earth.

In some implementations, the translational data acquired by the at least one translational seismic sensor is in response to activation of at least one active seismic source. An "active seismic source" refers to a seismic source that is controllable by a survey operator. In other implementations, the translational data acquired by the at least one translation seismic sensor can be part of a passive survey, which does not employ any active seismic source. A passive survey uses seismic sensors to perform one or more of the following: (micro) earthquake monitoring (a microearthquake is a relatively low intensity earthquake); hydro-frac monitoring where microearthquakes are observed due to rock failure caused by fluids that are actively injected into the subsurface (such as to perform subterranean fracturing); and so forth.

By using translation data and rotation data to derive the representation of the wavefield velocity, reliance does not have to be made on using measurements from an array of translational seismic sensors to compute the representation of the wavefield velocity, in some implementations. In some cases, an array of closely located (to within some predefined distance) translational seismic sensors may be employed to measure differences in arrival times of a wavefield at respective ones of translational seismic sensors. Such differences in arrival times can then be used to determine an apparent velocity at a specific one of the translational seismic sensors. Employing an array of translational seismic sensors for deriving apparent velocity can increase complexity.

By using techniques or mechanisms according to some embodiments, the determination of the representation of the velocity of the wavefield can be "locally" determined, based on just use of a single sensor assembly that includes a translational seismic sensor and a rotational sensor. Although reference is made to determining a representation of wavefield velocity locally, it is noted that such local determination of the representation of the wavefield velocity can be in the context of a survey arrangement that employs a pattern (e.g. array) of multiple seismic sensors. Also note that determination of the representation of the wavefield velocity can be based on measurements from multiple sensor assemblies.

By employing techniques or mechanisms according to some implementations, the determination of a representation of wavefield velocity can be accomplished in various different types of survey arrangements, including those with relatively sparse arrangements of seismic sensors (nodal seismic surveys for example).

Also, although reference is made in the present discussion regarding determining a representation of wavefield velocity in the context of performing seismic surveys of subterranean structures for characterizing the subterranean structures, it is noted that techniques or mechanisms according to further implementations can be used in determining a representation of wavefield velocity in the context of other types of surveys, such as surveys to perform imaging of human tissues, imaging of mechanical structures, and so forth. In such implementations, survey equipment can include a survey sensor (e.g. acoustic sensor, geophone, etc.) to measure translational data, and a rotation sensor to measure rotation data. Also the survey equipment can include an active survey source to generate acoustic waves that are propagated into a target structure (e.g. human tissue, mechanical structure, etc.). More generally, a survey sensor (or translational survey sensor) can refer to either a seismic sensor for surveying a subterranean structure, or an acoustic sensor for surveying another type of target structure.

As noted above, rotation data can be measured by a rotational sensor. The rotation data refers to the rotational component of the seismic wavefield. As an example, one type of rotational sensor is the R-1 rotational sensor from Eentec, located in St. Louis, Mo. In other examples, other rotational sensors can be used.

Rotation data refers to a rate of a rotation (or change in rotation over time) about a horizontal axis, such as about the horizontal inline axis (X) and/or about the horizontal crossline axis (Y) and/or about the vertical axis (Z). In the marine seismic surveying context, the inline axis X refers to the axis that is generally parallel to the direction of motion of a streamer of survey sensors. The crossline axis Y is generally orthogonal to the inline axis X The vertical axis Z is generally orthogonal to both X and Y. In the land-based seismic surveying context, the inline axis X can be selected to be any horizontal direction, while the crossline axis Y can be any axis that is generally orthogonal to X In some examples, a rotational sensor can be a multi-component rotational sensor that is able to provide measurements of rotation rates around multiple orthogonal axes (e.g. $R_X$ about the inline axis X, $R_Y$ about the crossline axis Y, and $R_Z$ about the vertical axis Z). Generally, $R_i$ represents rotation data, where the subscript i represents the axis (X, Y, or Z) about which the rotation data is measured.

In some examples, the rotation data can be obtained in two orthogonal components. A first component is in the direction towards the source (rotation around the crossline axis, Y, in the inline-vertical plane, X-Z plane), and the second component is perpendicular to the first component (rotation around the inline axis, X in the crossline-vertical plane, Y-Z plane). In such geometry, the rotation data in the X-Z plane is dominated by direct waves while the component perpendicular will be dominated by side scattered waves.

As sources (active sources or passive sources) may be located at any distance and azimuth from the rotation sensor location, the first component may not be pointing towards the source while the second component may not be perpendicular to the source-receiver direction. In these situations, the following pre-processing may be applied that mathematically rotates both components towards the geometry described above. Such a process is referred to as vector rotation, which provides data different from measured rotation data to which the vector rotation is applied. The measured rotation components $R_X$ and $R_Y$ are multiplied with a matrix that is function of an angle θ between the X axis of the rotation sensor, and the direction of the source $$\begin{bmatrix} R_I \\ R_C \end{bmatrix} = \begin{bmatrix} \cos\theta & -\sin\theta \\ \sin\theta & \cos\theta \end{bmatrix} \cdot \begin{bmatrix} R_y \\ R_x \end{bmatrix}.$$

as seen from the rotation sensor:

The foregoing operation results in the desired rotation in the Y-Z plane ($R_C$) and X-Z plane ($R_I$).

Another optional pre-processing step is the time (t) integration of the station data. This step can be mathematically described as:

$$R_x' = \int_{t=0}^{t=end} R_x \, dt.$$

The foregoing time integration of the rotation data results in a phase shift in the waveform and shift of its spectrum towards lower frequencies.

Rotation data (e.g. $R_X$ and/or $R_Y$) can be used to determine the horizontal slowness (or velocity) in the two orthogonal direction X inline, Y crossline ($p_x$ and $p_y$ respectively). The actual horizontal slowness p can be determined from the inline and crossline horizontal slownesses by:

$$p = \sqrt{p_x^2 + p_y^2}.$$

For inline propagating waves, $p_x = p$. For crossline propagating waves, $p_y = p$.

FIG. 1 is a schematic diagram of an arrangement of sensor assemblies (sensor stations) 100 that are used for land-based seismic surveying. Note that techniques or mechanisms can also be applied in marine surveying arrangements. The sensor assemblies 100 are deployed on a ground surface 108 (in a row or in an array or other pattern). A sensor assembly 100 being "on" a ground surface means that the sensor assembly 100 is either provided on and over the ground surface, or buried (fully or partially) underneath the ground surface such that the sensor assembly 100 is within approximately 10 meters of the ground surface, although in some embodiments, other spacing may be appropriate depending on the equipment being used. The ground surface 108 is above a subterranean structure 102 that contains at least one subterranean element 106 of interest (e.g. hydrocarbon reservoir, freshwater aquifer, gas injection zone, etc.).

One or more active seismic sources 104 (also referred to as "controlled seismic sources"), which can be vibrators, air guns, explosive devices, and so forth, are deployed in a survey field in which the sensor assemblies 100 are located. The one or more seismic sources 104 are also provided on the ground surface 108. The one or more active seismic sources 104 are activated in response to control by a survey operator, such as by issuing control signals from the control system 116 to the active seismic source(s) 104. Activation of the seismic sources 104 causes seismic waves to be propagated into the subterranean structure 102.

As noted above, instead of using active seismic sources to provide controlled source or active surveys, techniques according to some implementations can be used in the context of passive surveys (where active seismic sources are not provided).

Seismic waves reflected from the subterranean structure 102 (and from the subterranean element 106 of interest) are propagated upwardly towards the sensor assemblies 100. Seismic sensors 112 (e.g. geophones, accelerometers, or other translational seismic sensors) in the corresponding sensor assemblies 100 measure the translational data corresponding to the seismic waves reflected from the subterranean structure 102. Moreover, in accordance with various embodiments, the sensor assemblies 100 further include rotational sensors 114 that are designed to measure rotation data.

In some examples, it can be assumed that the impulse response of a rotational sensor 114 is known and properly compensated for—in other words, the rotation data is considered to be properly calibrated with respect to the translational data.

Although a sensor assembly 100 is depicted as including both a seismic sensor 112 and a rotational sensor 114, note that in other implementations, the seismic sensors 112 and rotational sensors 114 can be included in separate sensor assemblies.

In further example implementations, other types of sensors can also be included in the sensor assemblies 100, including divergence sensors (discussed further below).

In some implementations, the sensor assemblies 100 are interconnected by an electrical cable 110 to a control system 116. In other examples, instead of connecting the sensor assemblies 100 by the electrical cable 110, the sensor assemblies 100 can communicate wirelessly with the control system 116. In some examples, intermediate routers or concentrators may be provided at intermediate points of the network of sensor assemblies 100 to enable communication between the sensor assemblies 100 and the control system 116.

The control system 116 shown in FIG. 1 further includes a velocity determination module 120 that is executable on one or more processors 122. The processor(s) 122 is (are) connected to storage media 124 (e.g. one or more disk-based storage devices and/or one or more memory devices). In the example of FIG. 1, the storage media 124 is used to store translational data 126 communicated from the seismic sensors 112 of the sensor assemblies 100 to the control system 116, and to store rotation data 128 communicated from the rotational sensors 114 or derived from closely-spaced apart seismic sensors. The storage media 124 can also be used to store divergence data (not shown) in implementations where divergence sensors are used.

The stored translational data 126 can include vertical translation data (Z translational data), represented as $U_Z$, which is translation data oriented in the vertical direction (Z). $U_Z$ is measured by a vertical component of a seismic sensor 112. In further examples, the stored translational data 126 can also include horizontal translational data (X and/or Y translational data). Translational data in the X and Y directions are also referred to as horizontal vectorial components, represented as $U_X$ and $U_Y$, respectively. The $U_X$ and/or $U_Y$ data can be measured by respective X and Y components of a seismic sensor 112.

In operation, the velocity determination module 120 is used to determine, based on the translational data 126 and the rotation data 128, a representation of wavefield velocity. Although not shown, the control system 116 can further include other processing module(s) that can use the representation of the wavefield velocity to perform further processing, such as those listed further above.

Figure 2:
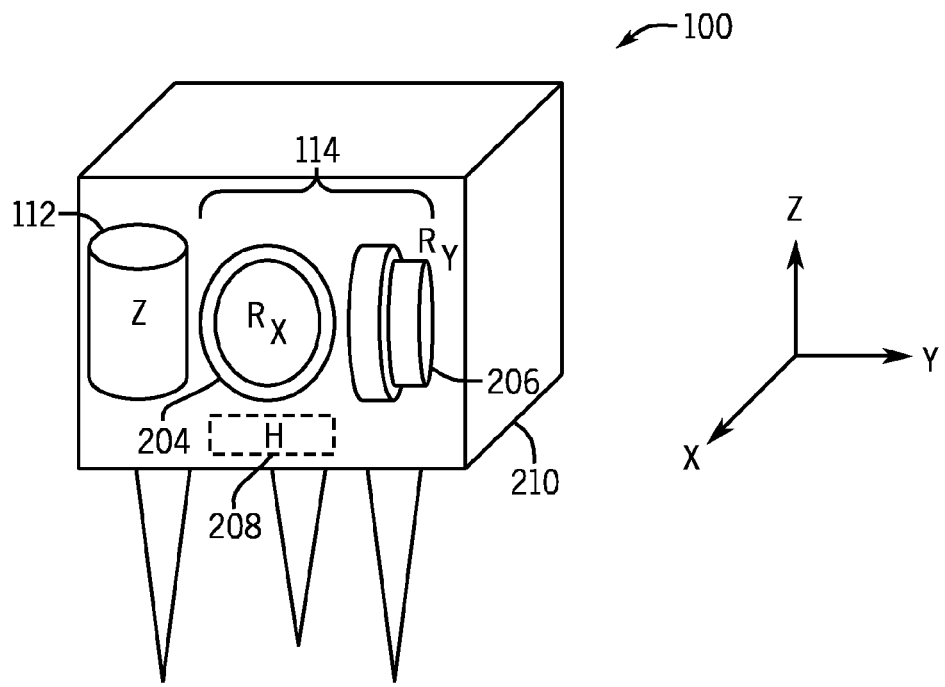
FIGS. 2 and 3 are schematic diagrams of sensor assemblies according to various embodiments.

FIG. 2 illustrates an example sensor assembly (or sensor station) 100, according to some examples. The sensor assembly 100 can include a seismic sensor 112 to measure translational data (e.g. displacement, velocity, acceleration, etc.) generally along a particular axis, such as the Z axis. The seismic sensor 112 is to measure the translational data "generally" along the particular axis in the sense that although a target placement of the seismic sensor 112 is for measuring rotation data about the Z axis, placement errors or manufacturing tolerances (associated with manufacturing and construction of the sensor assembly 100) can cause some deviation of the measured translational data such that the measured translational data is offset (by some predefined tolerance) with respect to the Z axis. In some examples, the sensor assembly 100 can also include seismic sensor(s) to measure translational data generally along the X or Y axis.

In addition, the sensor assembly 100 includes a rotational sensor 204 that is oriented to measure a crossline rate of rotation ($R_X$) generally about the inline axis (X axis), and another rotational sensor 206 that is oriented to measure an inline rate of rotation ($R_Y$) generally about the crossline axis (Y axis). The rotation data $R_X$ or $R_Y$ is "generally" about the X axis or Y axis, respectively, in the sense that although a target placement of the rotational sensor 204 or 206 is for measuring rotation data about the X or Y axis, placement errors or manufacturing tolerances can cause some deviation of the measured rotation data such that the measured rotation data is offset (by some predefined tolerance) with respect to the X or Y axis.

In some examples, a rotational sensor oriented to measure a vertical rate of rotation ($R_Z$) generally in the vertical axis (Z) can also be provided in the sensor assembly 100. Again, placement errors or manufacturing tolerances may cause an offset (by some predefined tolerance) from the vertical axis (Z). In other examples, the sensor assembly 100 can include just one of the rotational sensors 204 and 206. The sensor assembly 100 has a housing 210 that contains the sensors 112, 204, and 206. In implementations according to FIG. 2, a rotational sensor (204 or 206) is considered to be co-located with the seismic sensor 112 within the same housing 210.

The sensor assembly 100 further includes (in dashed profile) a divergence sensor 208, which can be included in some examples of the sensor assembly 100, but can be omitted in other examples. In some examples, in contexts where noise removal or attenuation is sought, divergence data from the divergence sensor 208 can be used to provide a noise reference model for performing noise attenuation. The noise model provided by the divergence data can be used in conjunction with the wavefield velocity determination technique according to some embodiments (that is based on the rotation data) for performing noise attenuation.

Figure 3:
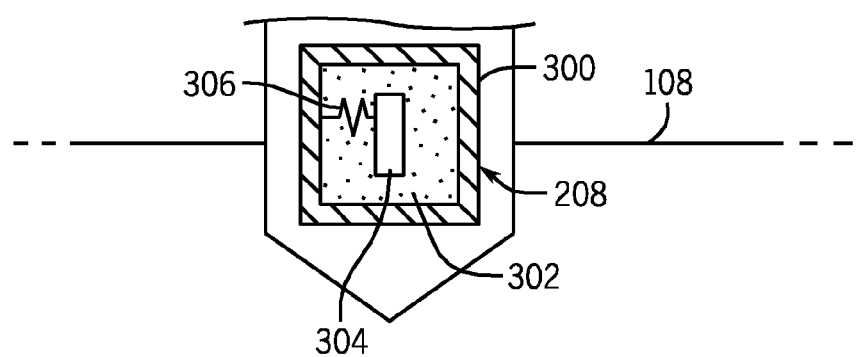

An example of a divergence sensor 208 is shown in FIG. 3. The divergence sensor 208 has a closed container 300 that is sealed. The container 300 contains a volume of liquid 302 (or other material such as a gel or a solid such as sand or plastic) inside the container 300. Moreover, the container 300 contains a hydrophone 304 (or other type of pressure sensor) that is immersed in the liquid 302 (or other material). The hydrophone 304 is mechanically decoupled from the walls of the container 300. As a result, the hydrophone 304 is sensitive to just acoustic waves that are induced into the liquid 302 through the walls of the container 300. To maintain a fixed position, the hydrophone 304 is attached by a coupling mechanism 306 that dampens propagation of acoustic waves through the coupling mechanism 306. Examples of the liquid 302 include the following: kerosene, mineral oil, vegetable oil, silicone oil, and water. In other examples, other types of liquids or another material can be used.

Figure 4:
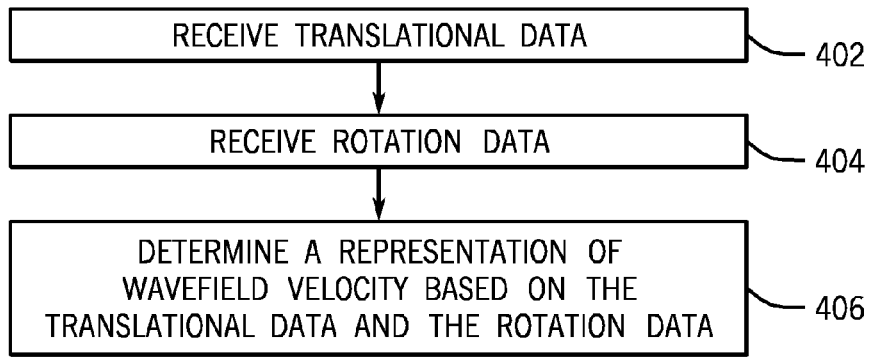
FIGS. 4 and 5 are flow diagrams of processes according to various embodiments.

FIG. 4 is a flow diagram of a process according to some embodiments. The process of FIG. 4 can be performed by the velocity determination module 120 in the control system 116 of FIG. 1, or by some other control system. The process receives (at 402) translational data acquired by at least one translational survey sensor. In some implementations, the acquired translational data is in response to activation of at least one seismic source (e.g. 104 in FIG. 1).

The process further receives (at 404) rotation data acquired by at least one rotational sensor. In some implementations, the acquired rotation data can include horizontal rotation data, which is rotation data generally about a horizontal axis (X and/or Y axis).

The process then determines (at 406) a representation of wavefield velocity based on the translational data and the rotation data. The determined representation wavefield velocity can be frequency-dependent. The representation of wavefield velocity can be computed for a particular frequency of the wavefield of interest—alternatively, multiple representations of wavefield velocity can be computed for respective different frequencies of the wavefield of interest. The representation of the wavefield velocity can be used for further processing, such as for noise attenuation, wavefield component separation, stacking, or other tasks that are related to performing seismic surveys for characterizing a subterranean structure. Characterizing the subterranean structure can include generating an image of the subterranean structure, generating a model of the subterranean structure, and so forth.

As noted above, the representation of the wavefield velocity can include an apparent velocity, a slowness, or some other indication of wavefield velocity. The apparent velocity (which corresponds to a slope of a seismic event in the time-space domain) is related to the inverse of the horizontal slowness p (apparent inline slowness $p_X$ and apparent crossline slowness $p_Y$). The horizontal slowness, p, remains constant over a ray path (the path of a seismic wavefield) and is also related to the direction of propagation of waves inside the subterranean structure. For example, the propagation angle (with respect to the vertical axis Z) is given by $\alpha = a\sin(p_X \cdot V_P)$ for P waves, where $V_P$ represents the actual velocity of the P waves at a given location within the subterranean structure. The propagation angle is given by $\alpha = a\sin(p_X \cdot V_S)$ for S waves, where $V_S$ represents the actual velocity of the S waves at a given location within the subterranean structure. In the foregoing, apparent velocity is equal to $1/p_X$.

The knowledge of the slowness p can allow for the determination of the ray path of a seismic event (for a known earth model defining the actual velocities $V_P$ and $V_S$, where the earth model represents a subterranean structure), or reciprocally, allows for the determination of the properties ($V_P$, $V_S$) if the ray path is known. For example, specifically considering horizontally propagating surface waves (e.g. ground-roll noise), the knowledge of p (for several frequencies) at a given sensor assembly provides information of the near-surface shear wave velocity below the given sensor assembly. Another application can use the apparent velocity of waves to discriminate a slowly propagating ground-roll noise from faster reflection signals of interest.

More generally, a representation of wavefield velocity, whether expressed as apparent slowness (e.g. p), apparent velocity (e.g. $v_P$, $v_S$) or any other indication of wavefield velocity, can be used for any of various purposes relating to surveys of a target structure, such as a subterranean structure.

Taking into account boundary conditions (free surface or land surface for land survey data or seafloor for marine survey data), it can be shown that the time differentiated crossline rotation data $R_Y$ is equal (or proportional if not properly calibrated) to the inline spatial derivative of the vertical translational data $U_Z$:

$$\frac{\partial R_Y}{\partial t} = \frac{\partial U_Z}{\partial X} = \frac{U_Z(X + \partial X/2, Y) - U_Z(X - \partial X/2, Y)}{\partial X}. \quad \text{(Eq. 1)}$$

Similarly, the time differentiated inline rotation data $R_X$ is equal (or proportional if not properly calibrated) to the crossline spatial derivative of the vertical translational data $U_Z$:

$$\frac{\partial R_X}{\partial t} = \frac{\partial U_Z}{\partial Y} = \frac{U_Z(X, Y + \partial Y/2) - U_Z(X, Y - \partial Y/2)}{\partial Y}. \quad \text{(Eq. 2)}$$

In the above equations, $\partial X$ and $\partial Y$ represent a distance offset in the X direction and a distance offset in the Y direction, respectively, and are relatively small distances compared to the wavelength of a wavefield of interest.

Eqs. 1 and 2 can be rewritten as:

$$R_Y = p_X U_Z, \quad \text{(Eq. 3)}$$

$$R_X = p_Y U_Z, \quad \text{(Eq. 4)}$$

where $p_X = \partial t/\partial X$ and $p_Y = \partial t/\partial Y$ are the inline and crossline horizontal slownesses, respectively). The value ôt represents a time offset.

Eqs. 3 and 4 show that the horizontal rotation data ($R_X$ and $R_Y$) are slowness-scaled versions of the vertical translational data (scaled by $p_Y$ and $p_X$ respectively). In other words, the horizontal rotation data and the vertical translational data are in phase and related by a factor proportional (equal when appropriately calibrated) to a representation of velocity (apparent slowness or velocity). These relations do not depend on the considered type of wavefield (e.g. P wave, S wave, Rayleigh wave, etc.).

As a result, at any given time, the slowness(es) (e.g. $p_X$ and/or $p_Y$) can directly be estimated from the rotation data $R_Y$ (and/or $R_X$, respectively) over the vertical translational data $U_Z$ (according to Eq. 3 or 4) regardless of the type of wavefield of interest. Stated differently, by processing for each time sample individually (and independently), where each time sample includes rotation data and translational data, the instantaneous slowness can be obtained. A time sample (or more briefly a sample) refers to measurement data collected at a point in time, where the measurement data includes rotation data and translational data.

Obtaining the horizontal slowness (or inversely apparent phase velocity) instantaneously (on an individual sample bases) can produce relatively high resolution results. In different examples, multiple samples can be considered together in certain scenarios, such as where the translational data (e.g. $U_Z$) approaches zero or other relatively small value, or where the measurement data (including rotation data and translational data is relatively noisy). Note that the computation of slowness according to Eq. 3 or 4 can be rewritten as follows:

$$p_X = R_Y/U_Z, \quad \text{(Eq. 5)}$$

$$p_Y = R_X/U_Z. \quad \text{(Eq. 6)}$$

In situations where $U_Z$ approaches a small value or where the measurement data is noisy, considering multiple samples together can help smooth/stabilize the results. Considering multiple samples together can be based on defining a time window of a predefined time length—measurement data collected in samples within that time window are aggregated to compute the slowness (or inversely apparent velocity).

In some examples, the computation of the ratio $R_Y$ (or $R_X$ or $R_I$ after rotation as described further above) over $U_Z$ based on multiple samples within a defined time window can be performed in either the time domain or in the frequency domain. In some examples, the computation of the ratio can be performed based on use of singular value decomposition (SVD) of signals (the measurement data containing rotation data and translational data) in each individual time window—such computation is performed in the time domain. In different examples, an RMS (root mean square) amplitude ratio can be used to compute the ratio $R_Y$ (or $R_X$) over $U_Z$, which can be performed either in the time domain or frequency domain.

In other examples, the aggregation of the rotation data and translational data of samples in each time window can be an average (or other aggregate, such as sum, etc.) of the rotation data or translational data, respectively. In each of Eqs. 5 and 6, the values $R_Y$, $R_X$, and $U_Z$ can be replaced with respective aggregate values, e.g. $\overline{R}_Y$ (which represents an average or other aggregate of multiple $R_Y$ samples in the time window), $\overline{R}_X$ (which represents an average or other aggregate of multiple $R_X$ samples in the time window), and $\overline{U}_Z$ (which represents an average or other aggregate of multiple $U_Z$ samples in the time window).

Figure 5:
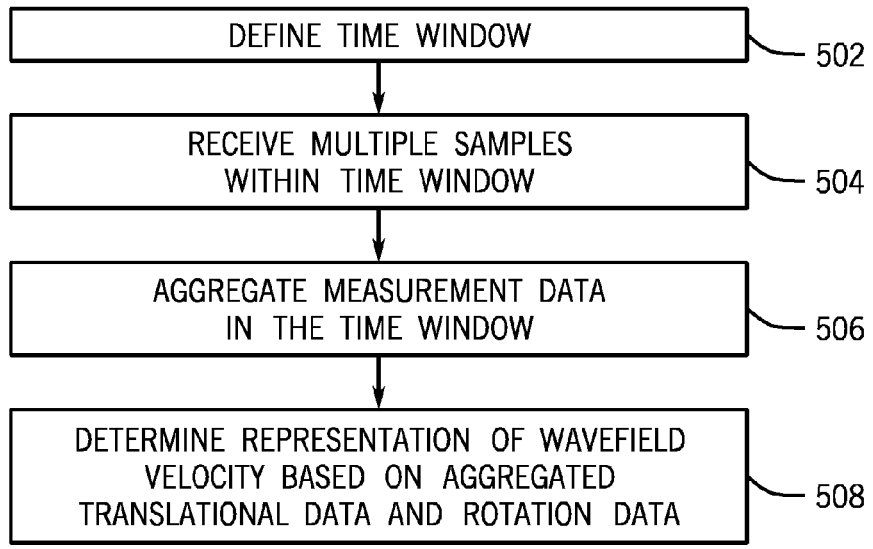

FIG. 5 is a flow diagram of a process of determining representations of wavefield velocity (e.g. $p_X$ and $p_Y$) based on multiple samples within a time window. The process of FIG. 5 can be performed by the velocity determination module 120 of FIG. 1 in the control system 116, or by another control system.

The process of FIG. 5 defines (at 502) a time window having a predefined time length. The process then receives (at 504) multiple samples in the time window. Each of the multiple time samples includes rotation data (acquired by at least one rotational sensor) and translational data (acquired by at least one seismic sensor).

The process then aggregates (at 506) the measurement data in the multiple time samples within the time window, such as based on use of the SVD technique, RMS amplitude technique, or other aggregation technique as discussed above.

Based on the aggregated rotation data and aggregated translational data, the process of FIG. 5 determines (at 508) the representations of the wavefield velocity (e.g. $p_X$ and $p_Y$).

The process of FIG. 5 can be re-iterated for subsequent time windows. In other words, given a defined time window of a predefined time length, plural successive time windows are considered. For each of the plural time windows, the process of FIG. 5 is applied to the multiple samples in the corresponding time window, and representation(s) of wavefield velocity is (are) computed for each corresponding time window.

Figure 6:
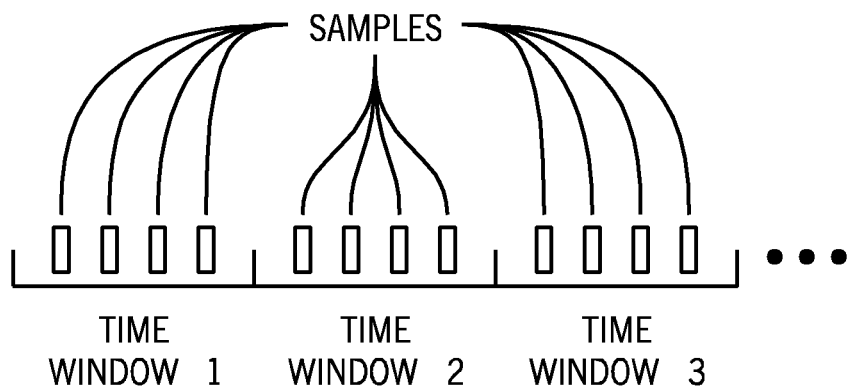
FIGS. 6 and 7 illustrate time windows containing samples of measurement data, to be used according to some embodiments.

The plural successive time windows can be discrete time windows, as illustrated in FIG. 6 (which shows time windows 1, 2, 3, and so forth). Within each time window, four samples are collected, according to the depicted example (different numbers per time window can be collected in other examples). With the discrete time windows, the samples in any first time window are mutually exclusive of the samples of any second time window (in other words, no two time windows share a sample).

Figure 7:
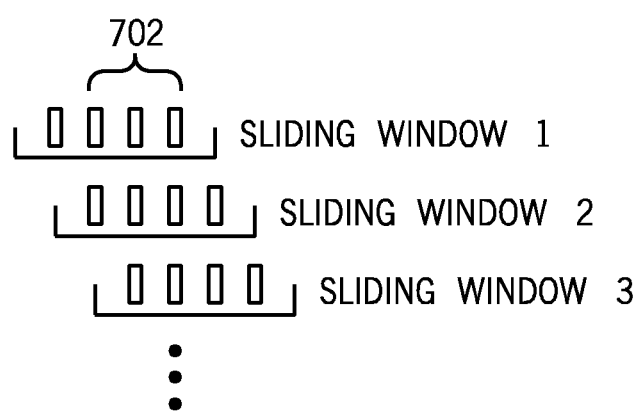

FIG. 7 illustrates a different example, in which the plural successive time windows are sliding windows. With the sliding-window implementation, two successive time windows are offset from each other by some predefined time offset, but the two successive time windows overlap. FIG. 7 shows sliding windows 1, 2, 3, and so forth. Due to overlap, two successive time windows share some number (one or more) of samples. In the example of FIG. 7, three samples 702 in sliding window 1 are shared with sliding window 2.

Analysis according to some implementations can also be performed in the frequency domain, in which the slowness is calculated for each frequency sample (or band) using one of the techniques above. This provides the apparent velocity of waves as a function of frequency (referred to as dispersion curves). When considering Rayleigh waves for instance, the dispersion curves can be used to obtain the S wave velocity of the near-surface.

The processes described in FIGS. 4-5 can be implemented with machine-readable instructions (such as the module 120 in FIG. 1). The machine-readable instructions are loaded for execution on a processor or multiple processors (e.g. 122 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); r other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving translational data acquired by at least one translational survey sensor in response to activation of at least one active survey source;
receiving rotation data about a first horizontal axis acquired by at least one rotational sensor; and
determining, by a computer, a representation of wavefield velocity based on the translational data and the rotation data, the determined representation of the wavefield velocity comprising an apparent slowness of a wavefield along a second horizontal axis or an apparent velocity of the wavefield along the second horizontal axis, the second horizontal axis orthogonal to the first horizontal axis, the apparent slowness or the apparent velocity of the wavefield being based on an incident angle of the wavefield with respect to a vertical axis, and an actual velocity of the wavefield, wherein determining the apparent slowness along the second horizontal axis or the apparent velocity along the second horizontal axis comprises computing a ratio of the rotation data about the first horizontal axis with respect to the translational data.

2. The method of claim 1, wherein determining the apparent slowness or the apparent velocity of the wavefield comprises determining an apparent horizontal slowness along the second horizontal axis or an apparent horizontal velocity along the second horizontal axis.

3. The method of claim 1, further comprising determining representations of the wavefield velocity at plural frequencies.

4. The method of claim 1, further comprising using the representation of the wavefield velocity to perform a task with respect to a seismic survey for characterizing a subterranean structure.

5. The method of claim 1, wherein receiving the translation data and the rotation data comprises receiving plural samples of the translational data and the rotation data, and wherein determining the representation of the wavefield velocity is based on the plural samples of the translational data and the rotation data.

6. The method of claim 5, wherein receiving the plural samples of the translational data and the rotation data comprises receiving the plural samples that are within a time window of a predefined length.

7. The method of claim 6, wherein the time window is a first time window, the method further comprising:
receiving further samples of translational data and rotation data in a second time window of the predefined length; and
determining a further representation of wavefield velocity based on the translational data and the rotation data in the further samples.

8. The method of claim 1, wherein the translational data is along the vertical axis, and wherein the ratio is of the rotation data about the first horizontal axis to the translational data along the vertical axis.

9. An article comprising at least one non-transitory machine-readable storage medium storing instructions that upon execution cause a system to:
receive translational data acquired by at least one translational survey sensor;
receive horizontal rotation data about a first horizontal axis; and
compute a representation of wavefield velocity based on the translational data and the horizontal rotation data, the computed representation of the wavefield velocity comprising an apparent slowness of a wavefield along a second horizontal axis or an apparent velocity of the wavefield along the second horizontal axis, the second horizontal axis orthogonal to the first horizontal axis, the apparent slowness or the apparent velocity of the wavefield being based on an incident angle of the wavefield with respect to a vertical axis, and an actual velocity of the wavefield, wherein computing the apparent slowness along the second horizontal axis or the apparent velocity along the second horizontal axis comprises computing a ratio of the horizontal rotation data about the first horizontal axis to the translational data.

10. The article of claim 9, wherein computing the representation of the wavefield velocity comprises computing a frequency-dependent representation of the wavefield velocity.

11. The article of claim 9, wherein receiving the horizontal rotation data comprises receiving the horizontal rotation data based on measurement of a rotational sensor, where the rotational sensor is co-located with the translational survey sensor within a housing.

12. The article of claim 9, wherein computing the representation of the wavefield velocity is for one or more frequencies of a wavefield of interest.

13. The article of claim 9, wherein the instructions upon execution cause the system to further rotate the rotation data, wherein computing the representation of wavefield velocity is based on the rotated rotation data.

14. The article of claim 9, wherein the translational data is along the vertical axis, and wherein the ratio is of the rotation data about the first horizontal axis to the translational data along the vertical axis.

15. A system comprising:
a storage medium to store rotation data about a first horizontal axis acquired by at least one rotational sensor, and translational data acquired by at least one translational survey sensor in response to activation of an active survey source; and
at least one processor to:
compute a representation of wavefield velocity based on the translational data and the rotation data, the computed representation of the wavefield velocity comprising an apparent slowness of a wavefield along a second horizontal axis or an apparent velocity of the wavefield along the second horizontal axis, the second horizontal axis orthogonal to the first horizontal axis, the apparent slowness or the apparent velocity of the wavefield being based on an incident angle of the wavefield with respect to a vertical axis, and an actual velocity of the wavefield, wherein the computing of the apparent slowness along the second horizontal axis or the apparent velocity along the second horizontal axis comprises computing a ratio of the rotation data about the first horizontal axis to the translational data.

16. The system of claim 15, wherein the translation data and the rotation data are part of plural samples within a time window of a predefined length, and wherein the representation of the wavefield velocity is based on the plural samples of the translational data and the rotation data.

17. The system of claim 15, wherein the translational data is along the vertical axis, and wherein the ratio is of the rotation data about the first horizontal axis to the translational data along the vertical axis.

* * * * *